United States Patent
Böhm

(10) Patent No.: US 10,451,060 B2
(45) Date of Patent: Oct. 22, 2019

(54) POSITIVE DISPLACEMENT PUMP HAVING MULTIPLE OPERATING STAGES

(71) Applicant: CONTINENTAL AUTOMOTIVE GMBH, Hannover (DE)

(72) Inventor: Christian Böhm, Frankfurt am Main (DE)

(73) Assignee: Continental Automotive GmbH, Hannover (DE)

( * ) Notice: Subject to any disclaimer, the term of this patent is extended or adjusted under 35 U.S.C. 154(b) by 222 days.

(21) Appl. No.: 15/499,338

(22) Filed: Apr. 27, 2017

(65) Prior Publication Data

US 2017/0227005 A1 Aug. 10, 2017

Related U.S. Application Data

(63) Continuation of application No. PCT/EP2015/075458, filed on Nov. 2, 2015.

(30) Foreign Application Priority Data

Nov. 3, 2014 (DE) .......................... 10 2014 222 396

(51) Int. Cl.
*F04C 2/00* (2006.01)
*F04C 28/18* (2006.01)
(Continued)

(52) U.S. Cl.
CPC .............. *F04C 14/04* (2013.01); *F04C 2/102* (2013.01); *F04C 14/12* (2013.01); *F04C 15/008* (2013.01);
(Continued)

(58) Field of Classification Search
CPC .......... F04C 2/102; F04C 14/04; F04C 14/12; F04C 15/06; F04C 15/008;
(Continued)

(56) References Cited

U.S. PATENT DOCUMENTS 3,208,392 A 9/1965 Garrison et al.
3,857,461 A 12/1974 Schmitt
(Continued)

FOREIGN PATENT DOCUMENTS

CN 101251108 A 8/2008
CN 103237989 A 8/2013
(Continued)

OTHER PUBLICATIONS

FR2689185 A1—Takeshi et al.—Ensemble a pompe a huile pour moteur—Oct. 1, 1993—English Translation (Year: 1993).*

(Continued)

*Primary Examiner* — Theresa Trieu

(57) ABSTRACT

A positive displacement pump for pumping oil in a motor vehicle transmission comprises a pump stage that has a central kidney-shaped suction cavity and two kidney-shaped pressure cavities. Oil is selectively pumped via one kidney-shaped pressure cavity or the other kidney-shaped pressure cavity in accordance with the direction of rotation of the pump stage. This makes it possible to create, with little complexity, two operating stages for the positive displacement pump.

11 Claims, 4 Drawing Sheets

(51) Int. Cl.
*F04C 14/04* (2006.01)
*F04C 2/10* (2006.01)
*F04C 14/12* (2006.01)
*F04C 15/00* (2006.01)
*F04C 15/06* (2006.01)
*F01M 1/02* (2006.01)
*F16H 57/04* (2010.01)

(52) U.S. Cl.
CPC ............... *F04C 15/06* (2013.01); *F01M 1/02* (2013.01); *F01M 2001/0238* (2013.01); *F04C 2210/206* (2013.01); *F04C 2240/20* (2013.01); *F04C 2270/205* (2013.01); *F16H 57/0436* (2013.01)

(58) Field of Classification Search
CPC ............ F04C 2210/206; F04C 2240/20; F04C 2270/205; F16H 57/0436; F01M 2001/0238; F01M 1/02
USPC ............. 418/15, 32, 166, 171; 417/302, 310
See application file for complete search history.

(56) References Cited

U.S. PATENT DOCUMENTS

| | | | | |
|---|---|---|---|---|
| 5,669,761 | A | * | 9/1997 | Kobayashi ............. F04C 14/26 417/302 |
| 5,759,013 | A | | 6/1998 | Miyazaki et al. |
| 2002/0037227 | A1 | * | 3/2002 | Kato ...................... F04C 2/102 418/171 |

FOREIGN PATENT DOCUMENTS

| | | |
|---|---|---|
| CN | 103270304 A | 8/2013 |
| DE | 3614819 C2 | 11/1987 |
| EP | 0785361 A1 | 7/1997 |
| EP | 2628954 A1 | 8/2013 |
| FR | 2689185 | 10/1993 |

OTHER PUBLICATIONS

Office Action dated Aug. 14, 2018 from corresponding Chinese Patent Application No. 201580059383.2.
International Search Report and Written Opinion dated Dec. 21, 2015 from corresponding International Patent Application No. PCT/EP2015/075458.
German Office Action dated Jul. 8, 2015 for corresponding German application 10 2014 222 396.2.

* cited by examiner

POSITIVE DISPLACEMENT PUMP HAVING MULTIPLE OPERATING STAGES

CROSS-REFERENCE TO RELATED APPLICATIONS

This application claims the benefit of PCT Application PCT/EP2015/075458, filed Nov. 2, 2015, which claims priority to German Application DE 10 2014 222 396.2, filed Nov. 3, 2014. The disclosures of the above applications are incorporated herein by reference.

FIELD OF THE INVENTION

The invention relates to a positive displacement pump, in particular for conveying oil in a gearbox or a combustion engine of a motor vehicle, having a pump stage that is driven by a drive unit, having a suction port for introducing oil and a pressure port for delivering oil and having a switchover device for creating two operating stages.

BACKGROUND OF THE INVENTION

Such positive displacement pumps are used in modern-day motor vehicles, for example for conveying lubricating oil in the combustion engine or gear oil in the gearbox, and are known from practice. The areas of application mostly have different design points; however, these design points are achieved by means of corresponding operating stages of the pump stage and of the drive unit. The design points relate in particular to a small conveying quantity at high pressure or a large conveying quantity at low pressure, according to the operating state of the gearbox or of the combustion engine.

A positive displacement pump has become known from DE 36 14 819 C2, in which a supply is provided to a high-pressure circuit and a low-pressure circuit by means of a divided kidney-shaped pressure cavity. The pump stage also has two pump chambers separated by a center wall.

SUMMARY OF THE INVENTION

The invention is based on the problem of designing a positive displacement pump of the type initially mentioned so that it has a particularly compact structure.

This problem is solved according to the invention by virtue of the fact that the suction port is connected to a central kidney-shaped suction cavity and the pressure port is connected to two kidney-shaped pressure cavities according to the selected operating stage.

This configuration allows the suction and kidney-shaped pressure cavities to be arranged on one side of the housing. The positive displacement pump is thus particularly compact. The position and size of the kidney-shaped pressure cavities is adapted to the desired conveying volumes and conveying pressures of the intended design points. By connecting the respective kidney-shaped pressure cavity to the single pressure port, the operating stage that is appropriate to the design point is selected. The rotational speed and the torque of the drive unit may thus be adapted to the operating stages in a simple manner and the degree of efficiency is increased.

According to another advantageous refinement of the invention, the switchover device is particularly simple if the switchover device is connected to the drive unit for the purpose of selectively controlling the drive direction of the pump stage. This configuration allows the operating stages to be established by the direction of rotation of the drive unit. In the simplest case, the switchover device requires switches for setting the polarity of an electric motor of the drive unit.

According to another advantageous refinement of the invention, the control of the flow from the kidney-shaped pressure cavities to the pressure port is particularly simple if the two kidney-shaped pressure cavities are connected to the single pressure port via check valves.

According to another advantageous refinement of the invention, pressure equalization of the kidney-shaped pressure cavity not used in the respective operating stage with the environment is ensured in a simple manner if the two kidney-shaped pressure cavities are connected to the suction port via check valves. The check valves connecting the kidney-shaped pressure cavities to the suction port are aligned in such a manner that, in case of negative pressure in the kidney-shaped pressure cavity, oil may flow in.

According to another advantageous refinement of the invention, the constructional complexity for connecting the pressure port to the selected kidney-shaped pressure cavity is kept particularly low if the switchover device is designed for connecting the pressure port to one or the other of the kidney-shaped pressure cavities.

According to another advantageous refinement of the invention, a large number of check valves is avoided in a simple manner if a multi-directional valve is connected downstream of the pump stage and if the switchover device is designed for activating the multi-directional valve, so that a selective connection of one kidney-shaped pressure cavity or the other kidney-shaped pressure cavity to the pressure port is established. As a result of this, the number of components susceptible to faults is kept low. It is simultaneously ensured that in each case only the intended kidney-shaped pressure cavity is connected to the pressure port. A further advantage of this configuration is that the positive displacement pump is consequently of particularly compact structure. In the case of a positive displacement pump intended for conveying oil in a gearbox of the motor vehicle, the multi-directional valve may, in the simplest case, be arranged in a gearbox control system that is present anyway. As a result of this, the installation space required for the positive displacement pump is kept particularly small.

According to another advantageous refinement of the invention, pressure equalization of the kidney-shaped pressure cavity not used in the respective operating stage with the environment is realized in a simple manner, when using a multi-directional valve, if the multi-directional valve has two switching stages, wherein the switching stages are configured for connecting the suction port to the kidney-shaped pressure cavity not used in the respective operating stage.

According to another advantageous refinement of the invention, a drop in the oil pressure in the gearbox or the combustion engine, with the positive displacement pump switched off, is avoided in a simple manner if the multi-directional valve has a switching stage in which the pressure port is shut off.

According to another advantageous refinement of the invention, in case of use in a motor vehicle, the positive displacement pump has a long service life if the pump stage is designed as an internal gear pump or as a G-rotor pump. Of course, it is also possible for two pump stages arranged in parallel to be able to be driven by a single drive unit.

According to another advantageous refinement of the invention, differing conveying volumes and conveying pressures is established in a simple manner in the operating stages if a separation region between the kidney-shaped suction cavity and one of the kidney-shaped pressure cavities, in the case of the pump stage designed as an internal gear pump, is arranged inside the region of maximum eccentricity between an inner rotor and an outer rotor and another separation region of the kidney-shaped suction cavity and the other of the kidney-shaped pressure cavities is arranged outside the region of maximum eccentricity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention permits numerous embodiments. For the purpose of further clarifying its basic principle, several of the embodiments are illustrated in the drawing and are described below. The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
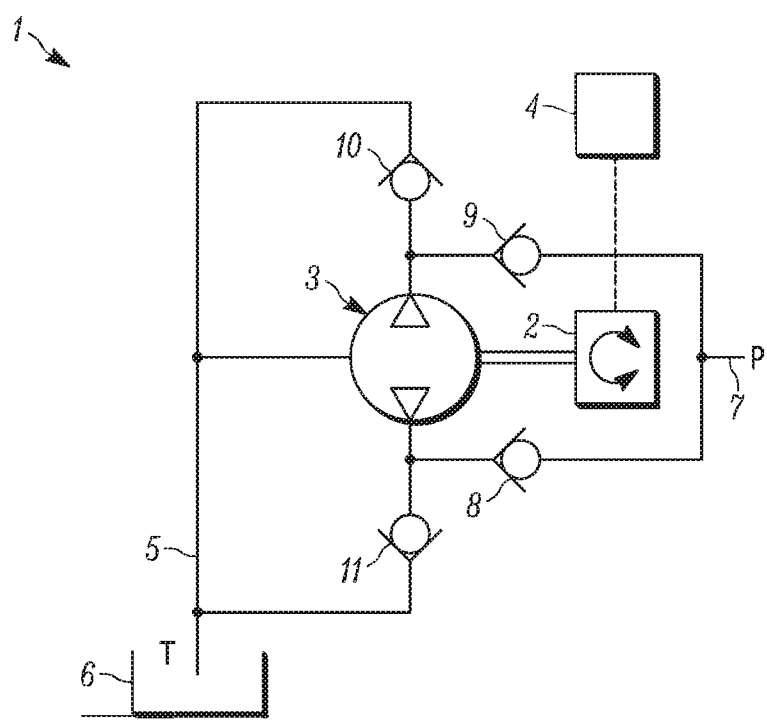
FIG. 1 is a diagrammatic illustration of a positive displacement pump, according to embodiments of the present invention.

FIG. 1 diagrammatically shows a positive displacement pump 1 having a motorized drive unit 2 and a pump stage 3. The motorized drive unit 2 is connected to a switchover device 4 and selectively drives the pump stage 3 in one or the other direction of rotation. The positive displacement pump 1 has a suction port 5, via which oil is sucked in from a tank 6 or an oil pan, and a pressure port 7, via which oil is conveyed to a consumer (not shown), such as lubrication points of a combustion engine or of a gearbox of a motor vehicle. The pump stage 3 is connected to the pressure port 7 and to the suction port 5 via a total of four check valves 8-11.

Figure 2:
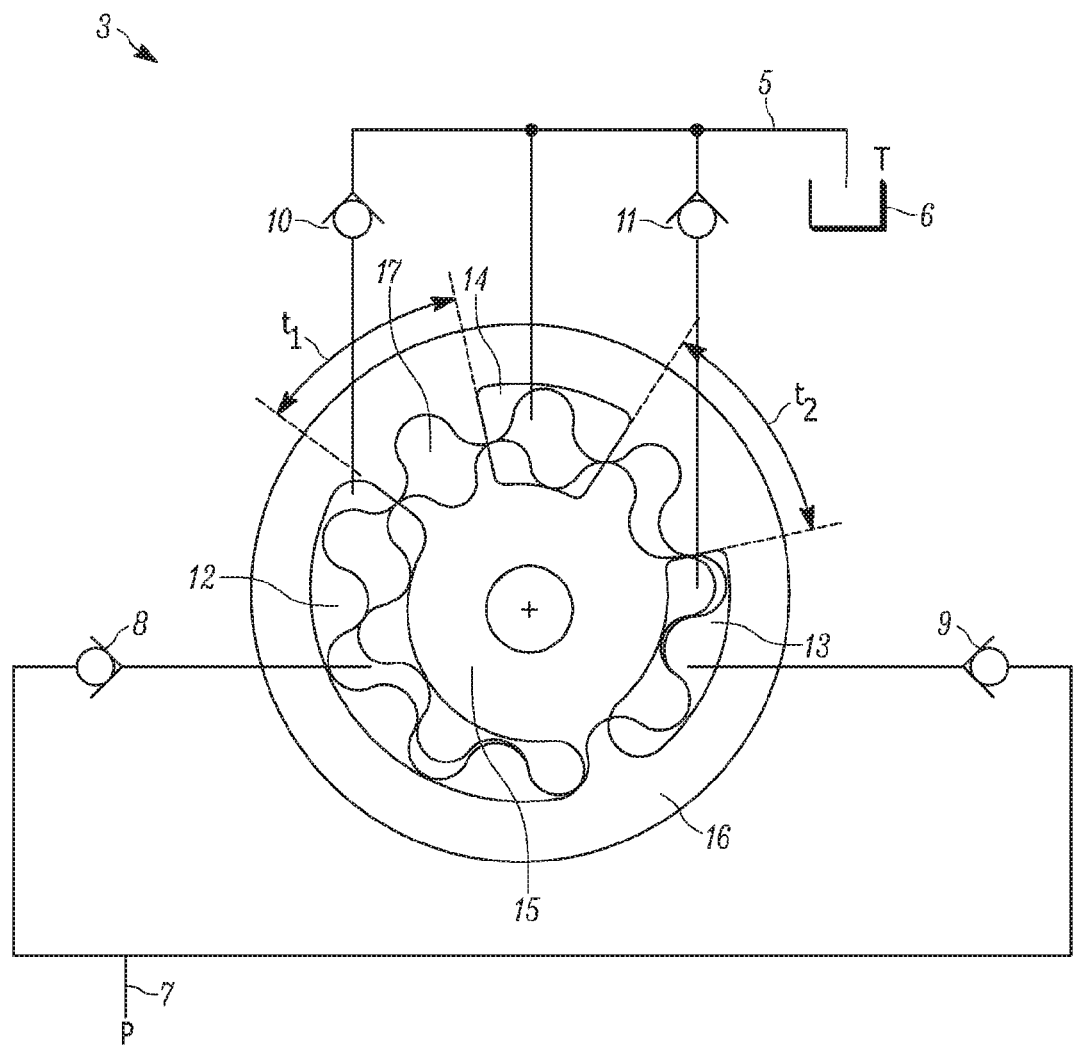
FIG. 2 is a sectional view of a pump stage with adjacent regions of a positive displacement pump, according to embodiments of the present invention.

As FIG. 2 diagrammatically shows in a sectional illustration, the pump stage 3 from FIG. 1 has two kidney-shaped pressure cavities 12, 13 and one central kidney-shaped suction cavity 14. Oil is sucked in via the kidney-shaped suction cavity 14 in both directions of rotation of the pump stage 3. The kidney-shaped pressure cavities 12, 13 are connected to the pressure port 7 via two of the check valves 8, 9. Furthermore, the kidney-shaped pressure cavities 12, 13 are connected to the suction port 5 via the further check valves 10, 11. The pump stage 3 is designed as an internal gear pump and has an inner rotor 15 and an outer rotor 16.

The kidney-shaped suction cavity 14 and the kidney-shaped pressure cavities 12, 13 are arranged in a housing 17 that seals off the front faces of the rotors.

In the case of a rotation of the inner rotor 15, as a result of a corresponding current feed to the drive unit 2, in the anticlockwise direction, oil is sucked in from the tank 6 or the oil pan via the central kidney-shaped suction cavity 14 and conveyed to the pressure port 7 via the kidney-shaped pressure cavity 12 illustrated on the left in the diagram.

In case of negative pressure, the kidney-shaped pressure cavity 13 illustrated on the right in the diagram also sucks in oil from the suction port 5 and thus complements the function of the kidney-shaped suction cavity 14. The connection of the kidney-shaped pressure cavities 12, 13 to the suction port 5 or the pressure port 7 is realized via the check valves 8-11. In case of the inner rotor 15 being driven in the clockwise direction, the oil is conveyed to the pressure port 7 via the kidney-shaped pressure cavity 13 illustrated on the right in the diagram. FIG. 2 furthermore shows that the pump stage 3 has separation regions t1, t2 of differing sizes between the common kidney-shaped suction cavity 14 and the kidney-shaped pressure cavities 12, 13 that are used, according to the selected direction of rotation. The kidney-shaped suction cavity 14 is arranged outside the region of maximum eccentricity of the pump stage 3. Consequently, one of the separation regions t1 is arranged in the region of maximum eccentricity and the other of the separation regions t2 is arranged outside the maximum eccentricity. Additionally, the kidney-shaped pressure cavities 12, 13 have differing dimensions, so that the pump stage 3 has differing conveying pressures and conveying volumes according to the kidney-shaped pressure cavity 12, 13 that is used for conveying.

Figure 3:
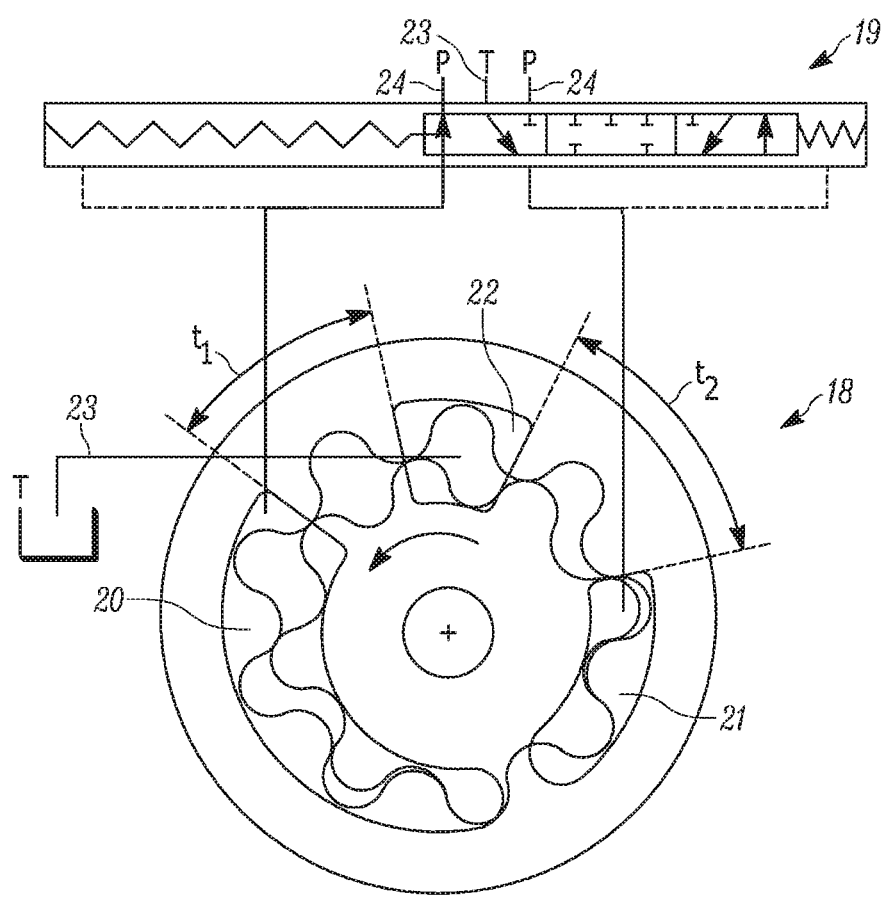
FIG. 3 is a sectional view of an alternate embodiment of a pump stage with adjacent regions of a positive displacement pump, according to embodiments of the present invention.

FIG. 3 diagrammatically shows a further embodiment of a pump stage 18, which differs from the embodiment of FIG. 2 only in that a multi-directional valve 19 is provided for controlling two kidney-shaped pressure cavities 20, 21 with the suction port 23 and with the pressure port 24. One kidney-shaped suction cavity 22 is, as in the case of the embodiment according to FIG. 2, connected to the suction port 23 without control. Control lines for controlling the multi-directional valve are illustrated in dotted form in the drawing, via which lines the position of the multi-directional valve 19 is controlled according to the direction of rotation of the pump stage 18. Alternatively, the multi-directional valve 19 may be connected to the switchover device 4 illustrated in FIG. 1 and is activated at the same time as the switchover of the direction of rotation of the pump stage 18.

The multi-directional valve 19 has three switching positions, wherein one of the switching positions shuts off the kidney-shaped pressure cavities 20, 21 and the pressure port 24.

Figure 4A:
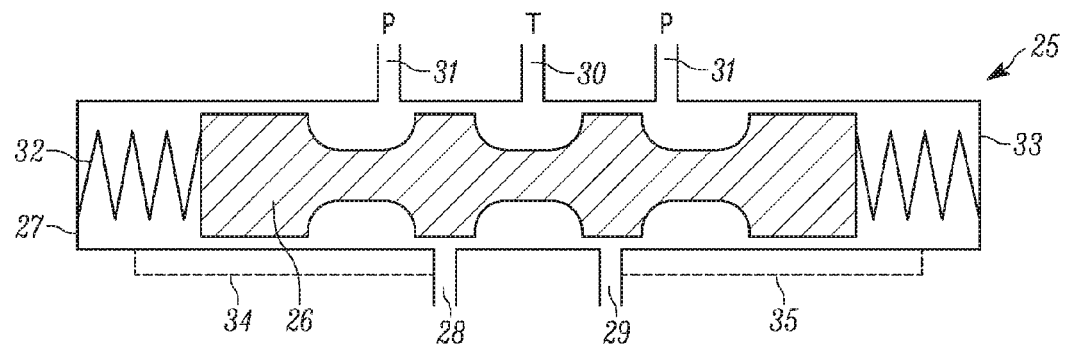
FIGS. 4a-4c are sectional views of various switching positions of a multi-directional valve used as part of a pump stage of a positive displacement pump, according to embodiments of the present invention.
Figure 4B:
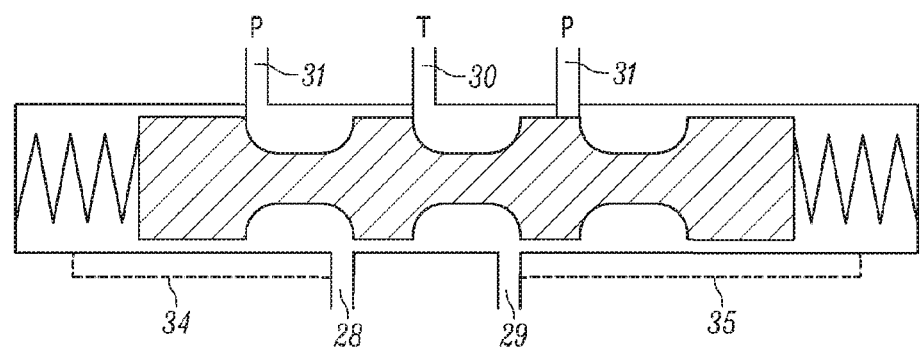
Figure 4C:
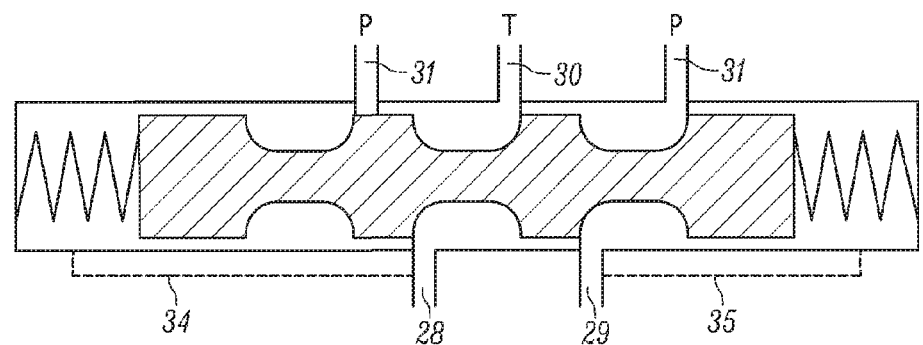

FIGS. 4a to 4c show a multi-directional valve 25 which, for example, is used in the embodiment according to FIG. 3 and has a valve body 26 and a valve housing 27. The multi-directional valve 25 respectively has a port 28, 29 which is led to a kidney-shaped pressure cavity, a suction port 30 and two pressure ports 31. In the middle position illustrated in FIG. 4a, all ports 28-31 are closed. In FIGS. 4b and 4c, one or the other of the ports 28, 29 that is led to the kidney-shaped pressure cavities is selectively connected to the pressure port 31. At the same time, the port 29, 28 not used for conveying oil in each case is connected to the suction port 30. Spring elements 32, 33 preload the multi-directional valve 25 into the middle position illustrated in FIG. 4a. The position of the valve body 26 may, for example, be controlled by the switchover device 4 by means of an electromagnet (not shown). Control lines 34, 35 are provided for controlling the multi-directional valve 25, via which lines the position of the multi-directional valve 19 is controlled according to the direction of rotation of the pump stage 18.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A positive displacement pump, for conveying oil in a gearbox or a combustion engine of a motor vehicle, comprising:
   a pump stage;
   a drive unit, the pump stage driven by the drive unit;
   a suction port in fluid communication with the pump stage, such that oil is drawn into the suction port by the pump stage;
   a single pressure port which receives pressured oil from the pump stage;
   a switchover device operable for placing the pump stage in one of a plurality of modes of operation;
   a central kidney-shaped suction cavity in fluid communication with the suction port; and
   two kidney-shaped pressure cavities;
   a first plurality of check valves;
   wherein the pressure port receives pressurized fluid from one of the two kidney-shaped pressure cavities when the positive displacement pump is placed in one of the plurality of modes of operation, and one of the first plurality of check valves places one of the two kidney-shaped pressure cavities in fluid communication with the single pressure port, and another of the first plurality of check valves places the other of the two kidney-shaped pressure cavities in fluid communication with the single pressure port.

2. The positive displacement pump of claim 1, wherein the switchover device is connected to the drive unit such that the switchover device selectively controls a drive direction of the pump stage.

3. The positive displacement pump of claim 1, further comprising:
   a second plurality of check valves;
   wherein one of the second plurality of check valves places one of the two kidney-shaped pressure cavities in fluid communication with suction port, and another of the second plurality of check valves places the other of the two kidney-shaped pressure cavities in fluid communication with the suction port.

4. The positive displacement pump of claim 1, wherein the switchover device places the single pressure port in fluid communication with one of the two kidney-shaped pressure cavities.

5. The positive displacement pump of claim 1, further comprising a multi-directional valve in fluid communication with the pump stage, wherein the switchover device places the multi-directional valve, in fluid communication with one of the two kidney-shaped pressure cavities, such that one of the two kidney-shaped pressure cavities is in fluid communication with the single pressure port.

6. The positive displacement pump as claimed in claim 5, the multi-directional valve further comprising a plurality of switching stages, wherein during each of the switching stages, one of the two kidney-shaped pressure cavities is in fluid communication with the single pressure port, and the other of the two kidney-shaped pressure cavities is placed in fluid communication with the suction port.

7. The positive displacement pump of claim 6, wherein the single pressure port is deactivated during one of the plurality of switching stages of the multi-directional valve.

8. The positive displacement pump as claimed of claim 1, the pump stage further comprising an internal gear pump.

9. The positive displacement pump as claimed in claim 8, further comprising:
   an inner rotor;
   an outer rotor, the outer rotor surrounding the inner rotor; and
   a region of maximum eccentricity between the inner rotor and the outer rotor;
   wherein as the inner rotor and outer rotor are rotated in a counter-clockwise direction, oil is transferred from the suction port, through the kidney-shaped suction cavity, to one of the two kidney-shaped pressure cavities, and flows through the single pressure port, and when the inner rotor and outer rotor are rotated in a clockwise direction, oil is transferred from the suction port, through the kidney-shaped suction cavity, to the other of the two kidney-shaped pressure cavities, and flows through the single pressure port.

10. The positive displacement pump as claimed in claim 9, further comprising:
    a first separation region located between the kidney-shaped suction cavity and one of the two kidney-shaped pressure cavities, such that the first separation region is located within the region of maximum eccentricity between the inner rotor and the outer rotor; and
    a second separation region located between the kidney-shaped suction cavity and another of the two kidney-shaped pressure cavities such that the second separation region is located outside the region of maximum eccentricity between the inner rotor and the outer rotor.

11. The positive displacement pump as claimed of claim 1, the pump stage further comprising a G-rotor pump.

* * * * *